United States Patent [19]

Molt

[11] 4,173,541
[45] Nov. 6, 1979

[54] POLYNUCLEAR HINDERED PHENOLS AND STABILIZED ORGANIC MATERIALS CONTAINING THE PHENOLS

[75] Inventor: Kenneth R. Molt, Cincinnati, Ohio

[73] Assignee: Cincinnati Milacron Chemicals Inc., Reading, Ohio

[21] Appl. No.: 912,171

[22] Filed: Jun. 5, 1978

[51] Int. Cl.² ............... C10M 1/26; C10L 1/18; C11C 3/02; C07C 43/20

[52] U.S. Cl. ............... 252/52 R; 252/57; 252/404; 44/78; 106/270; 260/45.85 B; 260/45.95 G; 260/410.5; 260/814; 560/72; 560/73; 560/138; 560/140; 426/544; 426/546; 568/640; 568/720

[58] Field of Search .......... 252/52 R, 57, 404; 44/78; 106/270; 260/45.85 B, 45.95 G, 410.5, 613 R, 814; 560/72, 73, 140, 138; 426/544, 546

[56] References Cited

U.S. PATENT DOCUMENTS

| | | | |
|---|---|---|---|
| 3,026,264 | 3/1962 | Rocklin et al. | 252/52 |
| 3,052,728 | 9/1962 | Rocklin | 260/619 |
| 3,053,803 | 9/1962 | Jaffe et al. | 260/45.95 |
| 3,067,259 | 12/1962 | Bailey | 260/613 |
| 3,265,661 | 8/1966 | Rocklin | 260/45.85 |
| 3,309,339 | 3/1967 | Barton et al. | 260/47 |
| 3,522,318 | 7/1970 | Ashton et al. | 260/613 |
| 3,644,538 | 2/1972 | Starnes | 252/52 R |
| 3,925,488 | 12/1975 | Shin | 260/619 B |

FOREIGN PATENT DOCUMENTS

| | | |
|---|---|---|
| 892261 | 3/1962 | United Kingdom . |
| 894620 | 4/1962 | United Kingdom . |
| 920476 | 3/1963 | United Kingdom . |
| 1229574 | 4/1971 | United Kingdom . |
| 1493760 | 11/1977 | United Kingdom . |

*Primary Examiner*—W. J. Shine
*Attorney, Agent, or Firm*—Donald Dunn

[57] ABSTRACT

Novel polynuclear hindered phenols having three hindered phenol groups each bonded through a methylene group to a substituted aromatic nucleus and methods of making same are provided which have stabilizing activity in organic substances normally susceptible to oxidative degradation.

69 Claims, No Drawings

POLYNUCLEAR HINDERED PHENOLS AND STABILIZED ORGANIC MATERIALS CONTAINING THE PHENOLS

FIELD OF INVENTION

This invention relates to polynuclear hindered phenols, to organic compositions stabilized therewith and methods for preparing polynuclear hindered phenols.

BACKGROUND

Alkylated phenols, as for example 2,6-di-tert-butyl-4-methyl phenol, and various other derivatives of phenol such as 2,6 di(3,5-di-tert-butyl-4-hydroxybenzyl) phenol have been well known in the art, especially with reference to stabilizing organic polymers, motor fuels, lubricants and other organic materials normally susceptible to oxidative deterioration, heat degradation and ultra violet light induced breakdown. Numerous organic materials of commerce (e.g., organic polymers, oils, waxes and greases) undergo deterioration during elevated temperature processing and use and therefore it is desirable to protect such materials against such deterioration. One aspect of such protection is the addition of an antioxidant to such material to protect against oxidative degradation. Heretofore phenolic compounds have been found to be deficient or of limited use in providing a high level of antioxidant protection by reason of such factors as low volatility, imparting color, low order of activity, short duration of activity and high cost. Overcoming such deficiencies is therefore highly desirable.

Surprisingly and advantageously, the polynuclear hindered phenols of this invention impart to polyolefins superior resistance to degradation (e.g., thermal and/or oxidative degradation), without significantly adding color, if any, to the polyolefin. Not only do the polynuclear hindered phenols of this invention advantageously impart superior degradation resistance to polyolefins but also provide other oxidation sensitive organic materials with greater resistance to degradation.

It is an object of this invention to provide a novel polynuclear hindered phenol. Another object of this invention is to provide a polynuclear phenolic antioxidant compound which is free from deficiencies of prior art phenolic antioxidants. A still further object of this invention is to provide a polynuclear hindered phenol having superior stabilizing properties. It is a further object of this invention to provide organic compositions containing a polynuclear hindered phenol which imparts to such compositions a high order of oxidation resistance. A further object of this invention is to provide a method for making polynuclear hindered phenols in high yield.

SUMMARY OF INVENTION

In accordance with this invention there are provided novel polynuclear hindered phenols having as a nucleus a monocyclic aromatic ring of six carbon atoms and attached thereto (1) at the 2,4,6 positions a 3,5-dihydrocarbyl-4-hydroxy benzyl group and (2) at the remaining open positions from 1 to 2 hydrocarbyloxy or organic ester groups. Further, in accordance with this invention there are provided organic compositions comprising an organic material normally susceptible to oxidative deterioration and a polynuclear hindered phenol as herein described. Additionally, there is provided a novel method for preparing the above described novel polynuclear hindered phenols.

DESCRIPTION OF INVENTION

There has now been discovered novel polynuclear hindered phenols exhibiting superior antioxidant activity and being free of the significant deficiencies of prior art hindered phenol antioxidants. The novel polynuclear hindered phenols discovered and exhibiting superior antioxidant activity in organic materials normally susceptible to oxidative deterioration are characterized by having a six carbon atom aromatic ring nucleus to which is attached (1) in the 2,4 and 6 positions, 3,5-dihydrocarbyl-4-hydroxy benzyl groups and (2) through oxygen from one to two organic groups, the remaining groups attached to the nucleus being hydrogen or a hydrocarbyl group, provided that when there is present only one organic group attached to the nucleus through oxygen that group must be a 3,5-dihydrocarbyl-4-hydroxy phenyl alkanoic acid radical.

The novel polynuclear hindered phenols of this invention are particularly useful as antioxidants in organic materials normally susceptible to oxidative deterioration.

Additionally, there has been discovered novel methods for preparing, in high yield, polynuclear hindered phenols according to general formula (I) set forth below, wherein there is employed acetic or formic acid.

The polynuclear hindered phenols in accordance with this invention are more particularly compounds according to the following general formula.

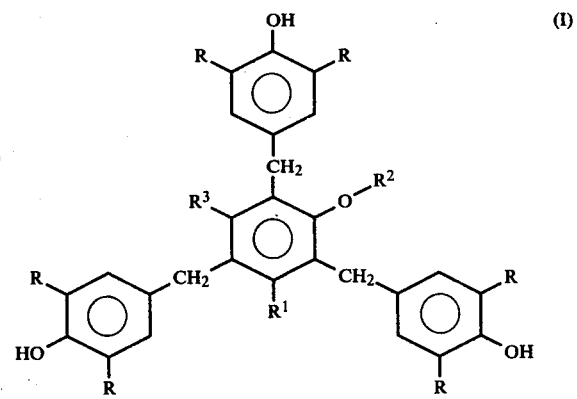

wherein
R is the same or different $C_1$ to $C_8$ hydrocarbyl group,
$R^1$ is hydrogen or a methyl group,
$R^2$ is $C_1$ to $C_{18}$ hydrocarbyl group,

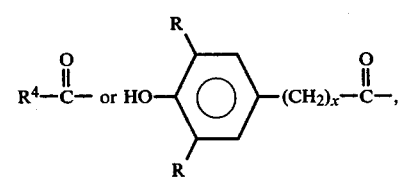

$R^3$ is hydrogen, methyl or $R^2$—O—,
$R^4$ is $C_1$ to $C_{17}$ hydrocarbyl and
x is an integer from 1 to 4
with the proviso that when $R^3$ is hydrogen or methyl $R^2$ must be

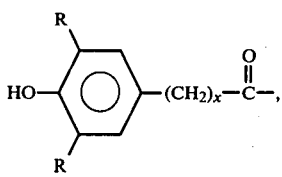

Additionally there are more particularly provided in accordance with this invention stabilized organic compositions comprising an organic material susceptible to oxidative deterioration and a polynuclear hindered phenol compound in accordance with the above general formula. In a more particular aspect of this invention, there are provided polynuclear hindered phenol compounds in accordance with the above general formula wherein the term hydrocarbyl group means hyrocarbon group and in a still more particular aspect wherein such hydrocarbon group is a aliphatic hydrocarbon group. Organic compositions provided in accordance with a still more particular aspect of this invention are organic compositions comprising an organic material susceptible to oxidative deterioration and a polynuclear hindered phenol in accordance with the above general formula wherein the term hydrocarbyl means hydrocarbon and more particularly aliphatic hydrocarbon.

As embodiments of the polynuclear hindered phenols according to this invention R in the above general formula may be the same or different aliphatic groups, particularly aliphatic hydrocarbon groups, having from one to eight carbon atoms. Such aliphatic groups may be saturated or unsaturated and branched or unbranched. R in the above general formula for a polynuclear hindered phenol in accordance with this invention may further be the same or different aryl, aralkyl, alkaryl or cycloalkyl of up to 8 carbon atoms. It is also contemplated that in reference to the above general formula some of the R groups may be acyclic while other R groups may be alicyclic in nature. Thus R may be methyl, ethyl, propyl, isopropyl, butyl, isobutyl, secondary butyl, tertiary butyl, pentyl, isopentyl, neopentyl, 1-methyl butyl, 1-ethyl propyl, hexyl, isohexyl, 1-methyl pentyl, 2-methyl pentyl, 3-methyl pentyl, 1-ethyl butyl, 3-ethyl butyl, octyl, isooctyl, 2-ethyl hexyl, 1-methyl heptyl, 2-butenyl, 2-pentenyl, 2-propenyl and 2-hexenyl. Additionally, R may be phenyl, benzyl, tolyl or cyclohexyl. It is preferred that R be an alkyl group having one to eight carbon and more preferably an alkyl group having branching on the alpha carbon atom. In accordance with the above general formula for polynuclear hindered phenols according to this invention $R^1$ may be hydrogen or a methyl group. When $R^2$ is $C_1$ to $C_{18}$, preferably $C_1$ to $C_{12}$, hydrocarbyl it may be a saturated or unsaturated, branched or unbranched aliphatic radical or it may be an aryl, aralkyl, alkaryl or cycloalkyl group. Preferably $R^2$ may be a saturated or unsaturated, branched or unbranched aliphatic radical such as for example methyl, ethyl, butyl, isobutyl, hexyl, octyl, 2-ethyl hexyl, decyl, dodecyl, allyl and 2-butenyl. It is, however, contemplated that $R^2$ may be phenyl, benzyl, 4-methyl phenyl or cyclohexyl. $R^4$ may be an aryl, aralkyl, alkaryl or cycloalkyl group of up to 17 carbon atoms or preferably a saturated or unsaturated, branched or unbranched alkyl group having from one to seventeen carbon atoms, preferably one to twelve carbon atom. Thus, $R^4$ may be a phenyl, benzyl, tolyl, cyclohexyl, methyl, ethyl, propyl, isopropyl, butyl, isobutyl, secondary butyl, tertiary butyl, pentyl, isopentyl, hexyl, isohexyl, octyl, 2-ethyl hexyl, isooctyl, decyl, dodecyl, heptadecyl, 2-butenyl, allyl or 2-methyl propenyl group. Where R, $R^2$, or $R^4$ are an unsaturated alkyl group such alkyl group shall contain from one to two carbon to carbon double bonds.

In a preferred embodiment of this invention (Embodiment I) there are provided (1) polynuclear hindered phenols according to the following general formula and (2) stabilized organic compositions comprising an organic material susceptible to oxidative deterioration and polynuclear hindered phenol according to the following general formula

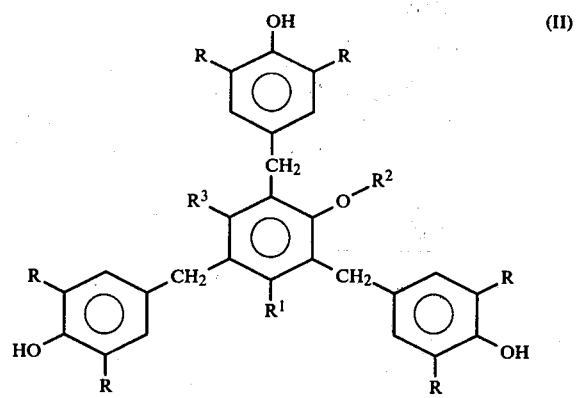

wherein
R is the same or different aliphatic hydrocarbon radical having one to eight carbon atoms
$R^1$ is hydrogen or a methyl group
$R^2$ is an aliphatic hydrocarbon radical having one to eighteen carbon atoms or

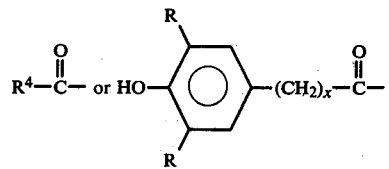

$R^3$ is hydrogen, methyl or $R^2$—O—
$R^4$ is an aliphatic hydrocarbon radical having one to seventeen carbon atoms.
x is an integer from 1 to 4
with the proviso that when $R^3$ is hydrogen or methyl $R^2$ must be

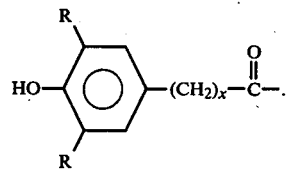

As further preferred embodiment of this invention (Embodiment II) there are provided polynuclear hindered phenols according to formula (II) of Embodiment I and stabilized organic compositions comprising an organic material susceptible to oxidative deterioration and a polynuclear hindered phenol according to the formula (II) of Embodiment I wherein R is the same or different branched, saturated alkyl radical having three to eight carbon atoms. In a still further preferred embodiment of this invention (Embodiment III) there are provided polynuclear hindered phenols according to the formula (II) of Embodiment I and stabilized organic compositions comprising an organic material susceptible to oxidative deterioration and a polynuclear hindered phenol according to the formula (II) of Embodiment I wherein R is an alkyl radical having branching on the alpha carbon atom and having three to eight carbon atoms.

As additional preferred embodiments of this invention, there are provided polynuclear hindered phenols and organic compositions, comprising an organic material susceptible to oxidative deterioration and a polynuclear hindered phenol, according to the formula (II) of Embodiment I above wherein $R^2$ is an alkyl radical having one to eighteen carbon atoms (Embodiment IV), wherein $R^3$ is $R^2$—O— and $R^2$ is an alkyl radical having one to eighteen carbon atoms (Embodiment V), wherein $R^3$ is hydrogen and $R^2$ is

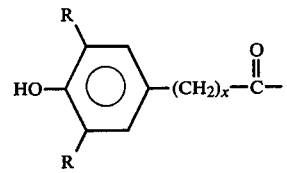

(Embodiment VI), wherein $R^3$ is methyl (Embodiment VII), wherein $R^4$ is an alkyl radical having one to seventeen carbon atoms (Embodiment VIII) and wherein the organic material susceptible to oxidative deterioration is a normally solid polyolefin (Embodiment IX) more particularly polyethylene (Embodiment X) or polypropylene (Embodiment XI).

Polynuclear hindered phenols of this invention according to general formula I include, but are not limited to compounds where

| R | $R^1$ | $R^2$ | $R^3$ |
|---|---|---|---|
| t-butyl | H | $CH_3CO-$ | $CH_3COO-$ |
| 3 methyl, 5-t-butyl | H | $CH_3CO-$ | $CH_3COO-$ |
| t-butyl | H | $CH_3-$ | $CH_3O-$ |
| t-butyl | H | $C_7H_{15}CO-$ | $C_7H_{15}COO-$ |
| t-butyl | H | $C_8H_{17}-$ | $C_8H_{17}O-$ |
| t-butyl | H | ![R-phenol-CH2CH2CO-*] | ![R-phenol-CH2CH2COO*] |
| t-butyl | H | ![R-phenol-CH2CH2CO-*] | H |
| t-butyl | H | ![R-phenol-CH2CO-*] | H |
| t-butyl | $CH_3$ | ![R-phenol-CH2CH2CO-*] | $CH_3$ |
| hexyl | H | $CH_3CO-$ | $CH_3COO-$ |
| isopropyl | H | $C_{12}H_{25}-$ | $C_5H_{11}COO-$ |
| isohexyl | H | ![R-phenol-CH2CO-*] | $C_3H_7COO-$ |
| t-butyl | H | ![R-phenol-CH2CO-**] | $C_8H_{17}O-$ |

| R | R¹ | R² | R³ |
|---|---|---|---|
| allyl | H | CH₃CO— | CH₃COO— |
| neopentyl | CH₃ | neopentyl | CH₃O— |
| isopropenyl | H | C₃H₇CO— | C₃H₇COO— |
| t-butyl | H | 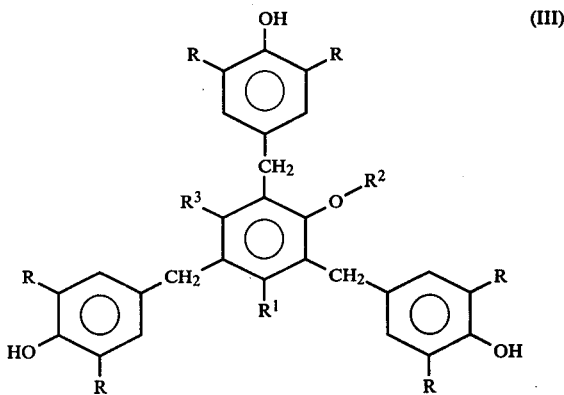 | CH₃ |
| t-butyl | H | C₁₇H₃₅CO— | C₁₇H₃₅COO— |

*R is tertiary butyl;
**R is methyl

A variety of organic materials are well known in the art to be susceptible to oxidative deterioration especially under elevated temperature conditions such as encountered during the processing and/or use of such materials. Organic materials susceptible to oxidative deterioration include, but are not limited to, hydrocarbon oils, hydrocarbon greases, waxes, animal fats and oils, vegetable fats and oils, natural and synthetic rubber and synthetic polymers such as polyolefins, polyamides, polystyrene, polyesters, polyvinyl chloride and polyurethanes.

Thus, this invention in respect to organic compositions comprising (1) an organic material susceptible to oxidative deterioration and (2) a polynuclear hindered phenol according to the following formula

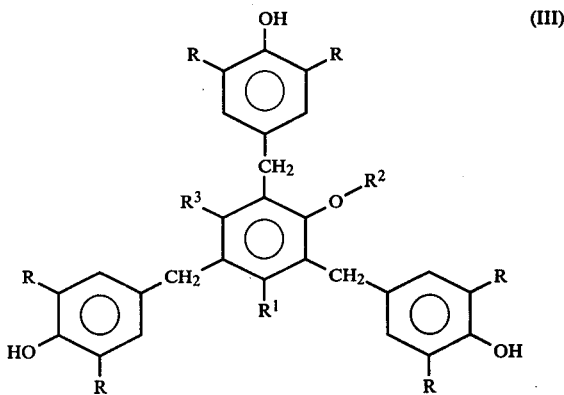

wherein R, R¹, R² and R³ are as herein before defined may be practiced wherein the organic material susceptible to oxidative deterioration may be hydrocarbon oil or grease (Embodiment XII), may be an animal fat or oil (Embodiment XIII), may be a vegetable fat or oil (Embodiment XIV), may be a synthetic or natural rubber (Embodiment XV), may be a polyamide (Embodiment XVI), may be polystyrene (Embodiment XVII), may be a polyester (Embodiment XVIII), may be preferably an acylonitrile/butadiene/styrene copolymer (Embodiment XIX), may be still preferably polyvinyl chloride (Embodiment XX) or may be more preferably a polyolefin, most preferably polyethylene or polypropylene (Embodiment XXI).

Preferably the organic compositions according to this invention comprise (1) an organic polymer susceptible to oxidative deterioration, more preferably a polyolefin susceptible to oxidative deterioration, and (2) a polynuclear hindered phenol according to formula (III). As polyolefins usable in the practice of this invention there include homopolymers and copolymers of ethylene, butene-1, propylene, pentene-1, hexene-1, 3-methyl-butene-1, 4-methyl-pentene-1 and 4-methyl-hexene-1. Mixtures of polyolefins may also be used in accordance with this invention. Among other polymers usable in the practice of this invention are homopolymers and copolymers of monomers such as vinyl chloride, vinyl bromide, vinyl acetate, vinyl propionate, vinyl butyrate, vinylidene chloride, vinyl benzoate, methyl acrylate, ethyl acrylate, methyl methacrylate, styrene, divinyl benzene, α-methyl styrene, butadiene, isoprene, acrylonitrile, acrylamide and methacrylamide. Chlorinated polymers such as chlorinated polystyrene and chlorinated polyethylene may also be used.

Wherein the organic compositions according to this invention comprise (1) an organic polymer susceptible to oxidative deterioration and (2) a polynuclear hindered phenol according to formula (III) there may also be employed conventional additives, well known in the art, such as fillers, pigments, dyes, lubricants, U.V. stabilizers, reinforcements, anti static agents, plasticizers, fire retardants and cross-linking agents.

The organic compositions according to this invention may be prepared by methods well known in the art. Such methods include dry and wet blending using conventional equipment at room temperature or at temperatures above or below room temperature.

The polynuclear hindered phenols according to this invention may be generally prepared by reacting a 3,5-dialkyl-4-hydroxy benzyl alcohol compound, wherein the alkyl groups are the same or different alkyl groups having one to eight carbon atoms, or a 3,5-dialkyl-4-hydroxy benzyl alkyl ether wherein the alkyl group of the ether has one to six carbon atoms and the 3,5 dialkyl groups are the same or different alkyl groups having from one to eight carbon atoms with an activated benzene ring such as

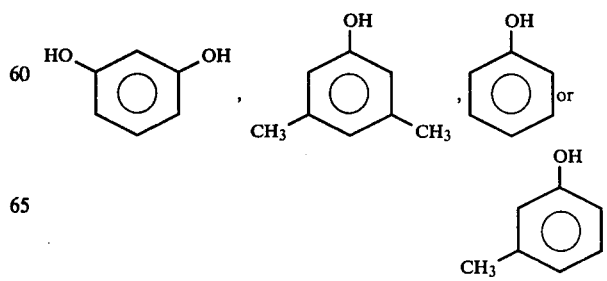

to form the intermediate having the general formula

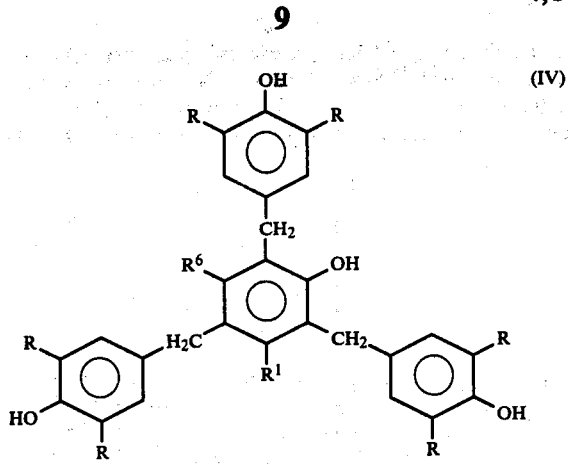

(IV)

wherein R and $R^1$ are as hereinbefore defined and $R^6$ is hydrogen or hydroxyl or methyl and then suitably reacting the intermediate of formula (IV) with the appropriate reagent (e.g., organic acid, organic anhydride, acyl halide or alkyl halide) to esterify or etherify the central benzene nucleus. Prior art methods for preparing the above described intermediate (formula IV) are disclosed in U.S. Pat. No. 3,053,803 (G. S. Jeffe et al), the entire disclosure of which is incorporated herein by reference.

Suitable 3,5-dialkyl-4-hydroxy benzyl alcohols include 3,5-ditertiary butyl-4-hydroxy benzyl alcohol; 3,5-diethyl-4-hydroxy-benzyl alcohol, 3,5-dioctyl-4-hydroxy benzyl alcohol; 3,5-diisooctyl-4-hydroxy benzyl alcohol; 3-methyl-5-tert-butyl-4-hydroxy benzyl alcohol; 3-tert.-butyl-5-isohexyl-4-hydroxy benzyl alcohol; 3,5-diisopropyl-4-hydroxy benzyl alcohol and 3-neopentyl-5-ethyl-4-hydroxy benzyl alcohol. As 3,5-dialkyl-4-hydroxy benzyl alkyl ethers there may be used 3,5-di-tert.-butyl-4-hydroxy benzyl methyl ether; 3,5-dioctyl-4-hydroxy benzyl butyl ether; 3-methyl-5-tert.-butyl-4-hydroxy benzyl ethyl ether; 3,5 diisohexyl-4-hydroxy benzyl propyl ether; 3,5-diisopropyl-4-hydroxy benzyl hexyl ether and 3-neopentyl-5-tert.-butyl-4-hydroxy-benzyl ethyl ether.

Organic acids which may be used to prepare the novel polynuclear hindered phenols of the invention described herein include acetic acid, propronic acid, butyric acid, pentanoic acid, hexanoic acid, heptanoic acid, octanoic acid, nonanoic acid, decanoic acid, dodecanoic acid, isobutyric acid, 3-methyl-butanoic acid, 4-methyl-pentanoic acid, 3-methyl-pentanoic acid, 2-methyl-pentanoic acid, 2-methyl-hexanoic acid, 2-ethyl hexanoic acid, 4-methyl-hexanoic acid, 3,5-dimethyl-4-hydroxy phenyl acetic acid, 3,5-di-tert.-butyl-4-hydroxy phenyl propanoic acid, 3,5-dioctyl-4-hydroxy phenyl butanoic acid and 3,5-diisopropyl-4-hydroxy phenyl propanoic acid. There may be used in place of an organic acid an organic anhydride such as for example acetic anhydride, butyric anhydride, hexanoic anhydride or octanoic anhydride. Alternatively an acyl halide, preferably an acyl chloride, such as for example; acetyl chloride, propionyl chloride, butyryl chloride, pentanoyl chloride, hexanoyl chloride, octanoyl chloride, 2-methyl-propanoyl chloride, 4-methyl-pentanoyl chloride, 2-ethyl-pentanoyl chloride, 3-methyl-hexanoyl chloride, 4-methyl-hexanoyl chloride, decanoyl chloride, 3-5-di-tert.-butyl-4-hydroxy phenyl propanoyl chloride, 3,5-dimethyl-4-hydroxy phenyl acetyl chloride, 3-methyl-5-tert.-butyl-4-hydroxy phenyl butyryl chloride, 3,5-diisopropyl-4-hydroxy phenyl propanoyl chloride, 3,5-di-2-ethyl hexyl-4-hydroxy phenyl acetyl chloride and 3-methyl-5-propyl-4-hydroxy phenyl butyryl chloride. Where an alkyl halide is employed it is preferred to use an alkyl chloride such as methyl chloride, ethyl chloride, butyl chloride, pentyl chloride, hexyl chloride, octyl chloride, decyl chloride, dodecyl chloride, isopropyl chloride, isobutyl chloride, tert.-butyl chloride, 2-chloro-hexane, 1-chloro-3-ethyl hexane, 2-chloropentane, 2-chloro-4-methyl pentane, 2-chloro-3-ethyl pentane, 3-chloro-3-ethyl pentane and 3-chloro-3-methyl octane. It is to be recognized that where chlorides have been designated there may be used in place thereof, the corresponding bromides and iodides. The quivalence of the activity of the corresponding bromides and iodides is well recognized in the art.

There has been discovered a novel process for making polynuclear hindered phenols according to the following general formula

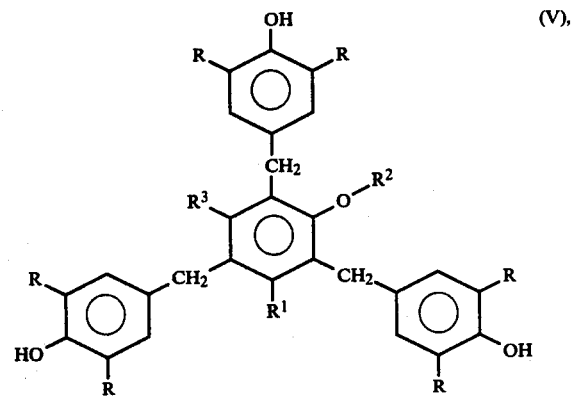

(V), wherein

R is the same or different $C_1$ to $C_8$ alkyl group, $R^1$ is hydrogen or a methyl group, $R^2$ is $C_1$ to $C_{18}$ alkyl group,

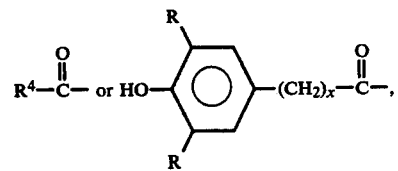

$R^3$ is hydrogen, methyl or $R^2$—O—

$R^4$ is $C_1$ to $C_{17}$ alkyl and x is 1 to 4 with the proviso that when $R^3$ is hydrogen or methyl, $R^2$ must be

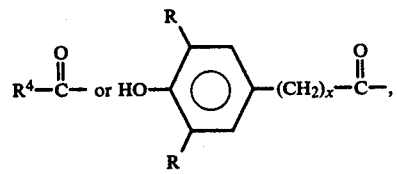

comprising the steps of (1) reacting 3,5-dialkyl-4-hydroxy benzyl alcohol, wherein the alkyl groups are the same or different alkyl groups having from one to eight carbon atoms, or 3,5 dialkyl-4-hydroxybenzyl alkyl ether, wherein the alkyl group of the ether has one to six carbon atoms and the 3,5-dialkyl groups are the same or different alkyl groups having from one to eight carbon atoms with an aromatic hydroxy compound selected from the group consisting of phenol, m-dihydroxy benzene, 3-methyl phenol and 3,5 dimethyl phenol in the presence of an organic acid selected from the group consisting of formic acid and acetic acid to form an intermediate having the formula

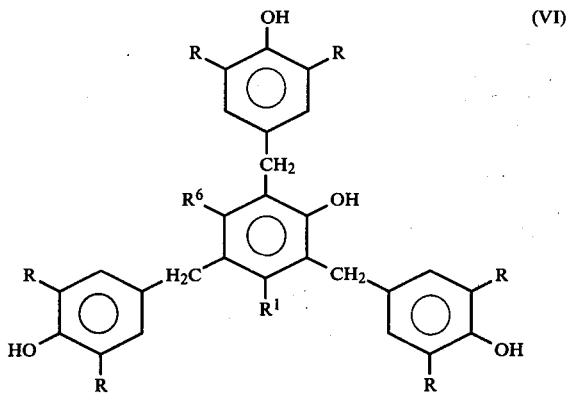

(VI)

wherein R is the same or different $C_1$ to $C_8$ alkyl group, $R^1$ is hydrogen or methyl and $R^6$ is hydrogen, hydroxyl or methyl, and (2) reacting the intermediate formed in step (1) with a compound selected from the group consisting of $C_1$ to $C_{18}$ alkyl halides, $C_1$ to $C_{12}$ alkyl salts of oxy acids of sulfur, $C_2$ to $C_{17}$ alkyl monocarboxylic acids, $C_4$ to $C_{26}$ acyclic alkyl anhydrides, $C_2$ to $C_{17}$ monoalkanoyl halides, 3,5-di($C_1$ to $C_8$ alkyl)-4-hydroxy phenyl $C_2$ to $C_5$ alkanoic acids and 3,5-di($C_1$ to $C_8$ alkyl)-4-hydroxy phenyl $C_2$ to $C_5$ alkanoyl halide. The use of formic acid in step (1) is preferred. The utility of compounds according to formula V has been previously described herein. In the above described novel process for preparing compounds according to formula V step (I) may be carried out in the presence of an inert solvent, preferably an inert water insoluble solvent (e.g., methylene chloride, hexane and VM&P naphtha). Known methods may be employed to carry out step (2).

Additionally, there has been discovered the process according to step (1) of the above described novel process for preparing the novel polynuclear hindered phenols according to formula (V), which is novel over, superior to and advantageous over prior art processes, for preparing the intermediates according to formula (VI). Thus, there is set forth herein a novel process for making compounds according to formula (VI), set forth above, comprising the step of reacting 3,5-dialkyl-4-hydroxy benzyl alcohol, wherein the alkyl groups are the same or different alkyl groups having from one to eight carbon atoms, or 3,5-dialkyl-4-hydroxy benzyl alkyl ether, wherein alkyl group of the ether has one to six carbon atoms and the 3,5-dialkyl groups are the same or different alkyl groups having from one to eight carbon atoms, with a compound selected from the group consisting of phenol, m-dihydroxy benzene, 3-methyl phenol and 3,5-dimethyl phenol in the presence of an organic acid selected from the group consisting of formic acid and acetic acid. The product of this novel process has antioxidant activity in synthetic polymers.

In accordance with the teachings of the prior art there is carried out, in the presence of strong acid catalysts such as hydrogen chloride, sulfuric acid or Friedel-Crafts catalystsf (e.g., ferric chloride, zinc chloride, aluminum chloride and boron trifluoride) the reaction between a 3,5-dialkyl-4-hydroxy benzyl alcohol or the alkyl ether derivative thereof and (1) a compound of the formula

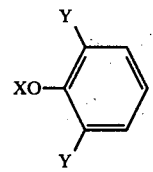

wherein X is an optionally substituted alkyl, cycloalkyl, aralkyl or aryl group and Y which may be the same or different represents hydrogen or an alkyl group, e.g., dimethyl anisole, (U.S. Pat. No. 3,522,318—July 28, 1970—S. Ashton et al) (2) a mononuclear aryl compound having one to three hydroxyl substituents attached to the ring carbon atoms and having at least one replaceable hydrogen atom attached to ring carbon atoms, e.g., mono, di and tri hydroxy benzene, (U.S. Pat. No. 3,053,803, Sept. 11, 1962—G. S. Jeffee et al) or mesitylene in the presence of p-toluene sulfonic acid (U.S. Pat. No. 3,925,488, Dec. 9, 1975—K. H. Shin). These prior art teachings are distinguished from the novel formic acid and acetic acid promoted process described herein for preparing compounds according to formula (VI) by employing as a catalyst, for the reaction, hydrogen chloride, sulfuric acid; a Friedel-Crafts catalyst (e.g. ferric chloride, zinc chloride, aluminum chloride and boron trifluoride) or p-toluene sulfonic acid instead of the formic acid or acetic acid of the process of this invention.

The strong acid catalysts of prior art processes for preparing compounds according to formula (VI) promote dealkylation reactions during the process. These dealkylation reactions (1) reduce the yield of the desired tris 3,5-dialkyl-4-hydroxy benzyl substituted benzene nucleus product, (2) increase the concentration of undesired by-products (e.g. mono and di 3,5-dialkyl-4-hydroxy benzyl substituted benzene nucleus products), (3) increase processing difficulties by complicating and/or prolonging separation steps for isolating the desired tris substituted product and (4) necessitate the use of reaction conditions which slow reaction rate for forming the desired tris substituted product thereby increasing the processing time and expense for making the desired tris substituted product.

In accordance with the above described invention in respect to the preparation of compounds according to formula VI there is advantageously no longer required the use of strong acid catalysts as is described in the prior art. Thus, the above described invention in respect to the preparation of compounds of formula VI advantageously (1) overcomes the attendant disadvantageous strong acid induced dealkylation reactions known in accordance with prior art processes and (2) provides significantly improved yields of formula VI compounds over prior art processes.

As is known to the person skilled in the art, the reactivity of a phenolic nucleus (i.e., a benzene ring bearing a single hydroxyl group attached to a ring carbon atom) toward substitution on the ring structure varies with type and number of other substituents which are present on the ring at the time the ring substitution reactions are to be carried out. Thus, phenol, dihydroxy benzene, 3-methyl phenol and 3,5-dimethyl phenol used in accordance with the above described invention for preparing compounds of formula (VI) would be expected to exhibit different reactivities in respect to the 3,5-dialkyl-4-hydroxybenzyl substitution reaction. Such variation in reactivity may be reflected in a variation in yield of the formula (VI) product.

In the process of this invention for preparing compounds according to formula (VI), which process comprises the step of reacting 3,5-dialkyl-4-hydroxybenzyl alcohol or 3,5-dialkyl-4-hydroxybenzyl alkyl ether with a compound selected from the group consisting of phenol, m-dihydroxybenzene, 3-methyl phenol and 3,5-dimethyl phenol in the presence of an organic acid selected from the group consisting formic acid and acetic acid, there may be employed an innocuous solvent, preferably a water insoluble solvent. Further, the process may be carried out at temperatures between 0° and 200° C., preferably 70° to 130° C.

Additionally, the process may be carried out at reduced pressure, atmospheric pressure or super atmospheric pressure. An air or preferably an inert atmosphere (e.g., $N_2$, $CO_2$, He or Ar) may be used. The amount of formic acid or acetic acid catalyst used may vary from 50 grams to 750 grams per mole of the 3,5-dialkyl-4-hydroxybenzyl alcohol or 3,5-dialkyl-4-hydroxybenzyl alkyl ether, however more or less formic acid or acetic acid may be used as process conditions may dictate.

In the following non-limiting examples all proportions and percentages are by weight and temperatures in degrees centigrade unless otherwise specified.

EXAMPLE 1

This example illustrates a prior art method of manufacture of the intermediate according to formula (VI). It is included for comparison only.

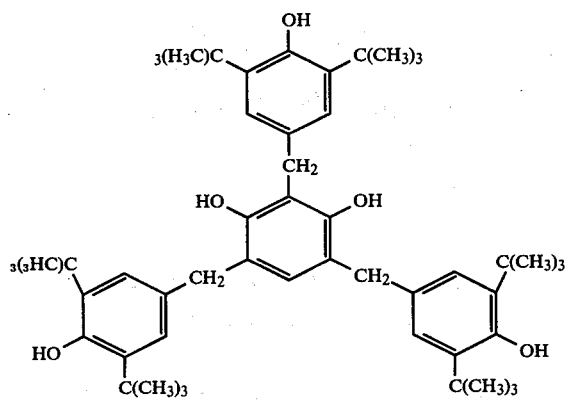

To a solution of 0.05 M of resorcinol and 0.165 m of 3,5-ditert-buty-4-hydroxybenzyl alcohol in 200 gms of methylene chloride at 0° C. there was added 50 gms of 80% $H_2SO_4$ dropwise in 30 minutes. The mixture was stirred at 0°-5° C. for 3 hours and washed four times with 150 gms of water. The methylene chloride was removed by vacuum stripping abnd the crude product recrystallized from 100 gm of heptane and 15 gms of xylene.

Yield—29.5 g (77.3% of theory)
MP—155°-165° C.
IR—consistent with the above structure

EXAMPLE 2

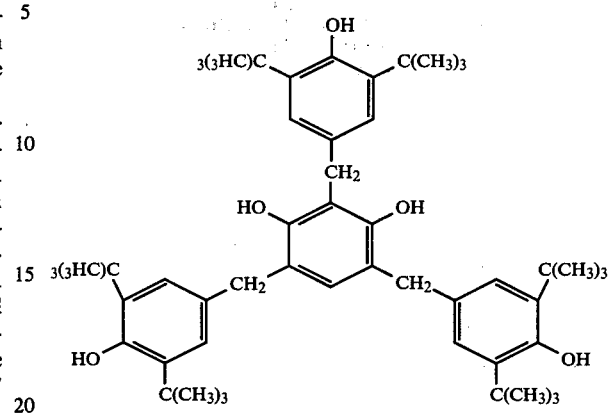

Resorcinol (0.05 M) was mixed with 0.16 M of 3,5-ditert-butyl-4-hydroxybenzyl alcohol, 100 g formic acid and 100 g of VM&P naphtha. The mixture was refluxed under a nitrogen atmosphere for 5 hours. After settling, the lower acid layer (91 g) was removed and the naphtha layer was freed of residual moisture and formic acid by refluxing into a water trap. Upon cooling to 20° C., the product separated as white crystals.

Yield=36.3 g (95.0% of theoretical)

MP=151°-154° C.

IR=

Non-hindered OH—broad band at 3510 cm$^{-1}$.

Hindered OH—sharp band at 3642 cm$^{-1}$.

NMR=Non-hindered OH—proton absorption at 4.77 PPM.

NMR=Hindered OH—proton absorptions at 4.99 and 5.05 PPM.

Molecular Weight=760 (765 calculated) by Gel-permeation chromatography.

EXAMPLE 3

Example 2 was repeated using the recovered formic acid (91 g) from example 2 plus 9 g of new formic acid as makeup.

Yield=36.9 g (96.5% of theory)

MP=150°-154° C.

Appearance=white powder.

IR=same as example 1.

This example demonstrates that the formic acid can be recycled by adding a suitable amount of makeup acid.

EXAMPLE 4

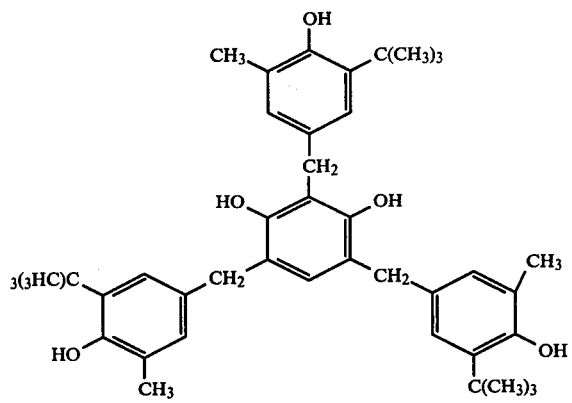

The procedure of example 2 was used except that 16 M of 3-methyl-5-tert-butyl-4-hydroxybenzyl alcohol was used. The product was obtained as a white crystalline solid melting at 124°–128° C.

Molecular Weight=645 (639 calc.) by Gel Permeation Chromatography

NMR=non-hindered OH proton absorption at 4.74 PPM.

NMR=hindered OH proton absorptions at 4.97 PPM and 5.03 PPM.

EXAMPLE 5

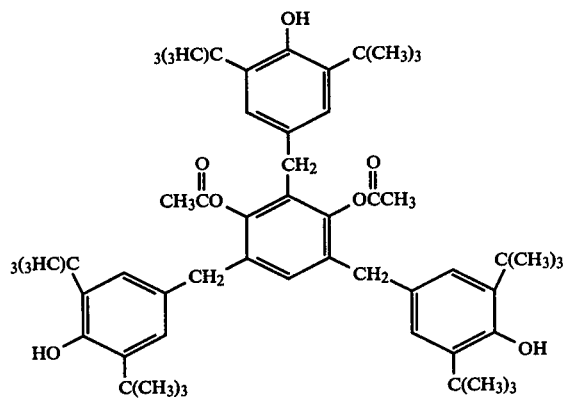

The compound of example 2 (0.03 M) made in accordance with Example 2, was refluxed with 0.16 M of acetic anhydride for 5 hours. Unreacted acetic anhydride and acetic acid was removed by stripping to 190° C. at 2.0 mm Hg pressure. The crude product was recrystallized from 100 g of VM&P naphtha.

Yield=24.1 g (94.5% of theory)

MP=173°–176° C.

Appearance=white powder.

IR=The non-hindered OH band of example 2 is now gone thus showing the reaction of these OH's. A strong hindered OH band at 3650 cm$^{-1}$ is present.

EXAMPLE 6

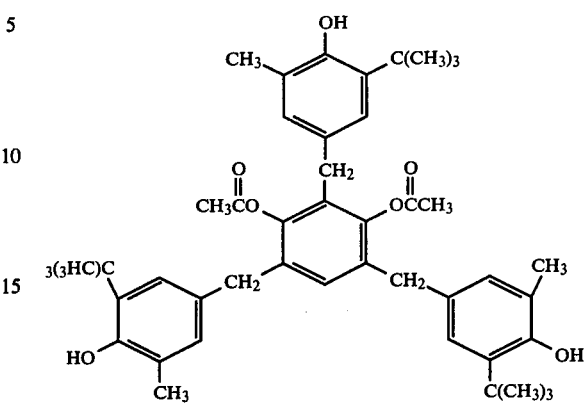

The method of example 5 was used to acetylate the compound of example 4, made in accordance with the procedure of Example 4.

Yield=93% of theory.

MP=136°–140° C.

Appearance=white powder.

IR=consistent with the above structure.

EXAMPLE 7

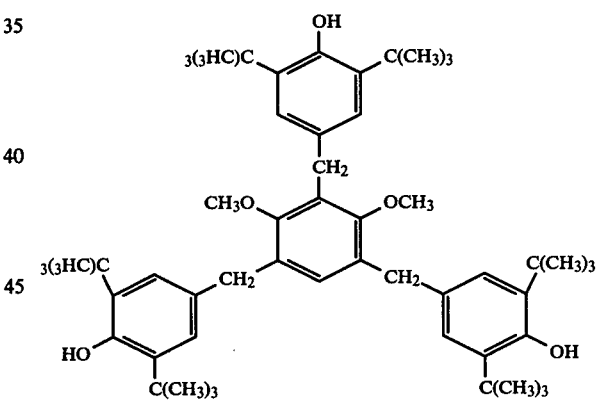

To a mixture of 0.04 M of the compound of Example 3, made in accordance with the procedure of Example 3, in 130 g acetone, 15 g H$_2$O and 9.6 g 50% NaOH, there was added 0.12 M of dimethylsulfate. The mixture was refluxed for 3 hours then diluted with 80 g VM&P naphtha and washed with 100 g of water and sufficient acetic acid to lower the pH to 7. The naphtha layer was dried by refluxing into a water trap then cooled to 20° C. to crystallize the product.

Yield=25.5 g (80.2% of theory).

MP=175°–178° C.

Both NMR and IR showed the non-hindered OH to be absent indicating complete reaction.

EXAMPLE 8

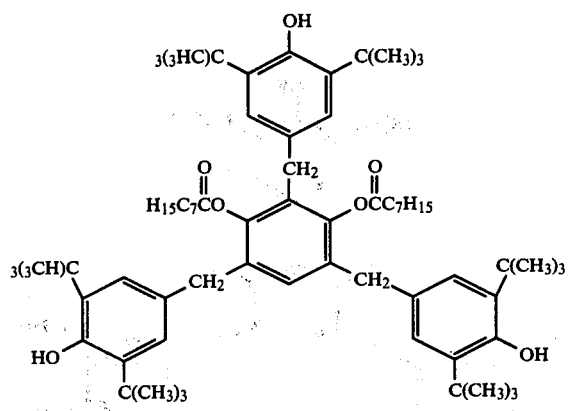

To 0.03 M of the compound, as produced in accordance with Example 2, there was added 100 g of triethylamine and 0.08 M of octanoyl chloride. The mixture was stirred for 10 hours at 25°–30° C., diluted with 100 g of heptane and filtered to remove the amine hydrochloride. The heptane and excess triethylamine was removed by vacuum stripping up to 140° C. at 15 mm Hg.

The crude product was crystallized from a mixture of methanol and isopropanol.

Yield = 21 g
MP = 112°–115° C.
IR = consistent with the above structure.

EXAMPLE 9

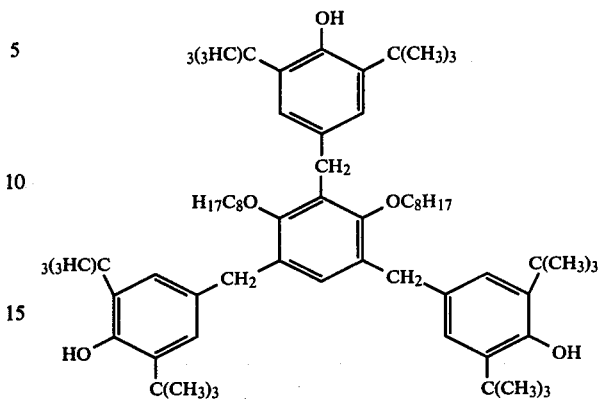

To 0.04 M of the compound, as produced in accordance with Example 2, there was added 0.16 M of n-octyl chloride, 0.10 M of $Na_2CO_3$, 2.0 g of KI and 100 g of dimethylformamide. The mixture was refluxed for 10 hours, then stripped to 140° C. at 15 m Hg to remove DMF and excess octyl chloride. The crude product was dissolved in heptane, washed with water and the heptane removed by stripping to 140° C. at 15 mm Hg. Recrystallization from a mixture of methanol and ethanol gave the product as yellow crystals melting at 79°–83° C.

EXAMPLE 10

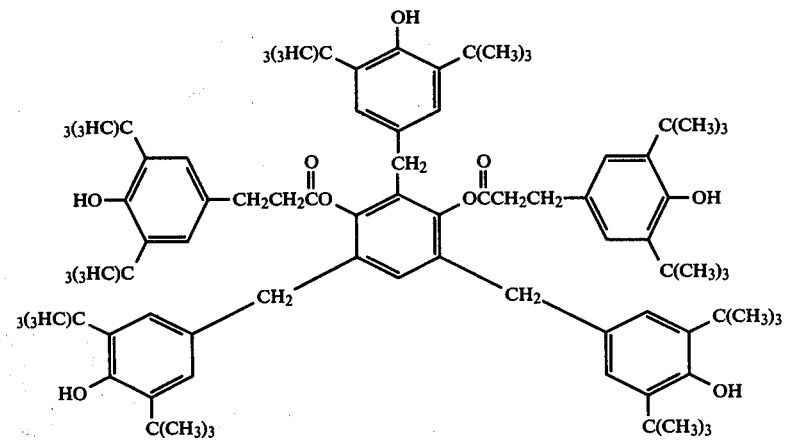

To 0.03 M of the compound, as produced in accordance with Example 2, there was added 0.07 M of 3-(3,5-di-t-butyl-4-hydroxyphenyl) propionyl chloride and 100 g of triethylamine. The mixture was stirred at 20°–30° C. for 24 hours. 100 g of heptane were added and the amine hydrochloride removed by filtration. After stripping to 140° C. at 15 mm Hg the crude product was recrystallized from a mixture of methanol and isopropanol to give yellow crystals melting at 89°–94° C. IR and NMR spectra were consistent with the above structure.

EXAMPLE 11

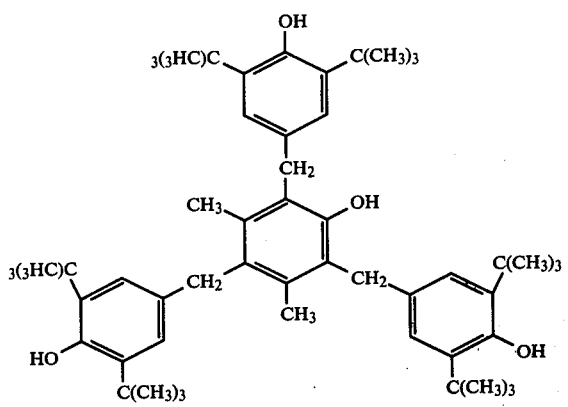

To 0.05 M of 3,5-dimethylphenol there was added 0.16 M of 3,5-di-t-butyl-4-hydroxybenzylmethyl ether, 100 g of formic acid and 100 g of VM&P naphtha. The mixture was refluxed for 4 hours under a nitrogen atmosphere. After settling, the lower acid layer (89 g) was removed and the naphtha layer was freed of residual moisture and formic acid by refluxing into a water trap. Upon cooling to 20° C., the product separated as white crystals.

Yield=37.0 g (95.2% of theory)

MP=203°–205° C.

Both the NMR and IR spectra are consistent with the above structure.

EXAMPLE 12

The same as Example 11 except that acetic acid was used in place of formic acid.

Yield=34.1 g (87.8% of theory)

MP=203°–205° C.

EXAMPLE 13

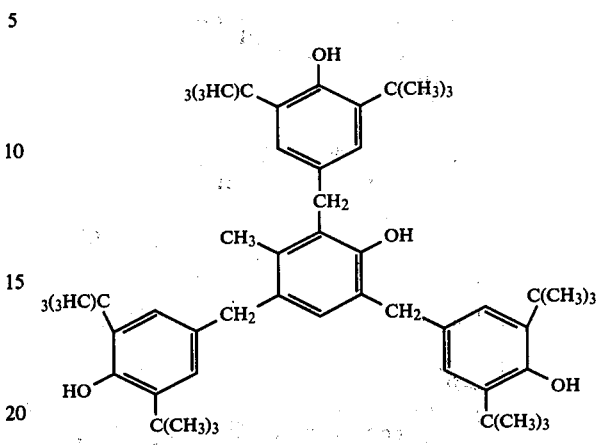

The procedure of Example 11 was used except that meta-cresol was used in place of 3,5-dimethylphenol.

Yield=21.0 g (55.1% of theory)

MP=155°–160° C.

IR=consistent with the above structure.

Appearance=white crystals.

EXAMPLE 14

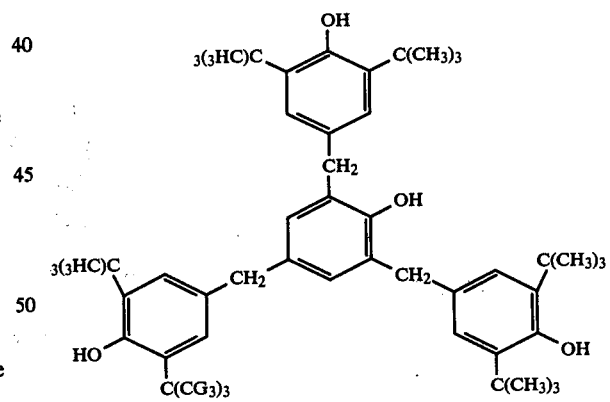

The procedure of Example 11 was used except that phenol was used in place of 3,5-dimethylphenol.

Yield=20.4 g (54.5% of theory)

MP=122°–125° C.

Appearance=white crystals.

IR=consistent with the above structure.

EXAMPLE 15

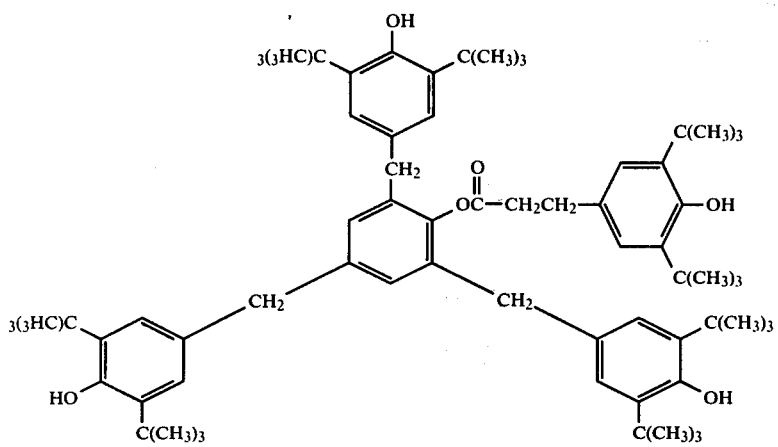

To 0.02 M of the compound of example 14 prepared in accordance with Example 14, there was added 0.025 M of 3-(3,5-di-t-butyl-4-hydroxyphenyl) propionyl chloride and 80 g of triethylamine. The mixture was stirred at room temperature for 24 hours. Heptane (100 g) was added and the amine hydrochloride was removed by filtration. After stripping off the heptane and triethylamine, the crude product was recrystallized from methanol and ethanol.

Appearance = white powder

MP = 81°–85° C.

IR = confirmed that the non-hindered OH on the central nucleus was reacted.

EXAMPLE 16

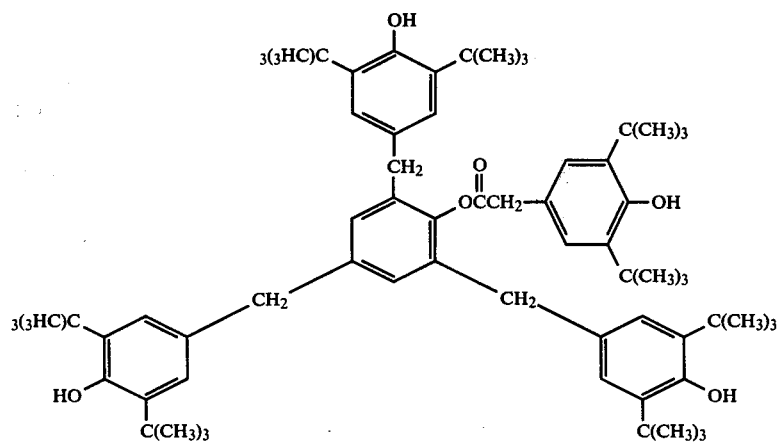

Employed the same procedure as Example 15 except that (3,5-di-t-butyl-4-hydroxyphenyl) acetyl chloride was used.

MP = 92°–95° C.

Appearance = white powder

EXAMPLE 17

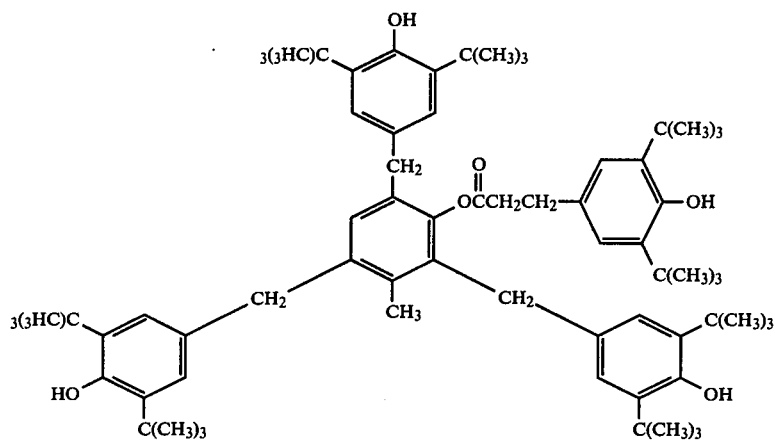

Made by the procedure of Example 16 using the product of Example 11, prepared according to Example 11

Yield=23 g (74.1% of theory)
Appearance=white powder
MP=208°-210° C.
Both the IR and NMR spectra confirm the above structure.

EXAMPLE 18

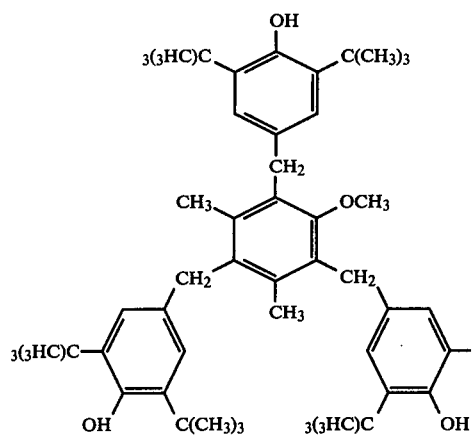

This compound was made by the method of Example 1 in U.S. Pat. No. 3,522,318, the disclosure of which is incorporated herein by reference. M.P.—233°-225° C. It is included for purpose of comparison only.

EXAMPLE 19

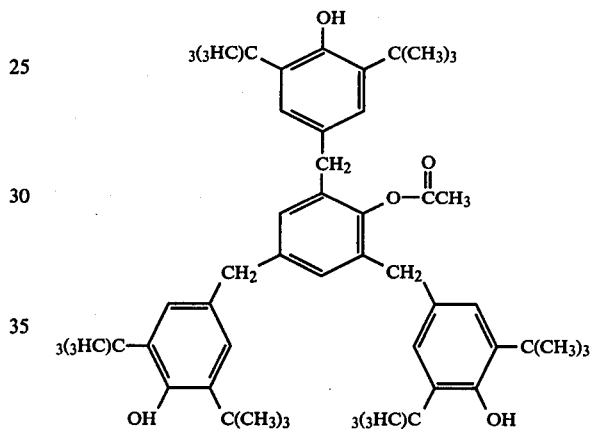

This compound was made by the method described in U.S. Pat. No. 3,265,661 (column 5, line 63 to column 6, line 5), the disclosure of which is incorporated herein by reference. M.P.—142°-144° C. It is included for comparison purposes only.

EXAMPLE 20

Following the procedure of Example 15, 0.02 moles of the compound of Example 14 is reacted with 0.025 moles of stearoyl chloride to produce a compound having the formula

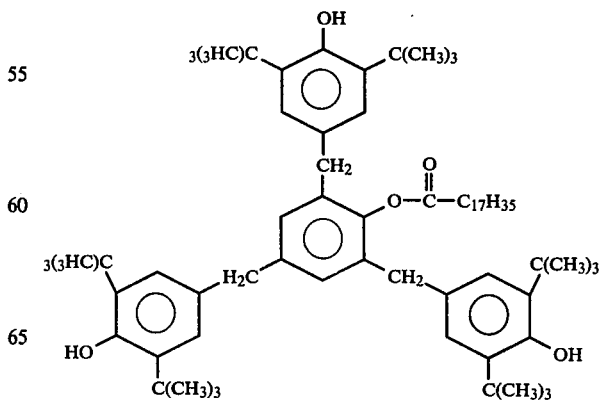

EXAMPLE 21

Using the procedure of Example 8, there is reacted 0.03 moles of the compound of Example 2 with 0.08 moles of lauroyl chloride to produce a compound having the following formula

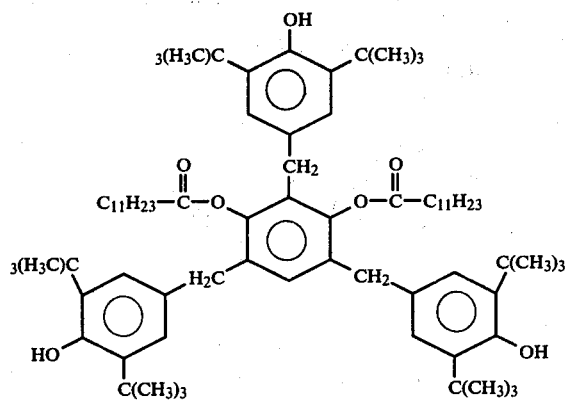

When tested in polypropylene at 0.05% along with 0.15% of distearylthiodipropionate the compounds failed at 912 hours for Example 19 and 944 for Example 20. The polynuclear hindered phenols of this invention were tested as stabilizers for polypropylene (Profax 6501) in accelerated aging tests run at 150° C. in a circulating air oven on conventionally prepared 30 mil press polished plaques, using 0.05% of the indicated compound and 0.15% of distearylthiodipropionate. Degradation was indicated by severe darkening and embrittlement.

| Compound of Example | Hours to Degrade |
|---|---|
| none | 50 |
| 5 | 1528 |
| 6 | 964 |
| 7 | 1528 |
| 8 | 1396 |
| 9 | 1416 |
| 10 | 1642 |
| 15 | 1540 |
| 16 | 1548 |
| 17 | 1516 |

Linear polyethylene, containing 0.05% of the indicated compounds, showed the following losses in tensile strength after the indicated time at 120° C.

| Compound of Example | Time (weeks) | Percent Loss of Tensile |
|---|---|---|
| none | 2 | 100 |
| 5 | 12 | 9 |
| 6 | 12 | 24 |
| 7 | 12 | 8 |
| 8 | 12 | 12 |
| 9 | 12 | 10 |
| 10 | 12 | 8 |
| 15 | 12 | 9 |
| 16 | 12 | 9 |
| 17 | 12 | 9 |

Polyvinyl chloride (Geon 103, Goodyear) containing 0.5% dimethyltin bis-isooctylthioglycolate, 0.5% stearic acid and 0.1% of the indicated compounds was processed on a 2 roll mill, the resulting sheet pressed into 30 mil plaques and the plaques heated at 180° C. in a circulating air oven. The change in color after 4 hours is noted below.

| Compound of Example | Color |
|---|---|
| 5 | yellow |
| 7 | yellow |
| 10 | pale yellow |
| 16 | yellow |
| 17 | yellow |
| None | black |

An alkyl resin varnish containing 0.5% of the compound of example 5 is lighter in color than a control panel containing no additive, upon one month exposure to UV light.

Diisooctyl azelate, high temperature lubricant, is stabilized against discoloration and viscosity change by the addition of 2.0% of the compound of Example 7, by two-week heat tests at 150° C.

Paraffin wax is stabilized by 0.01% of the compound of Example 7.

White mineral oil has less discoloration at 150° C. when stabilized by 0.1% of the compound of Example 5.

Several of the polynuclear hindered phenols of this invention are tested in a natural rubber latex formulation at 0.25% for their effectiveness in preventing discoloration and loss of flexibility. A 10 mil wet film on unsized cotton was aged for 100 hours at 100° C. The results are

| Compound of Example | Color | Flexibility |
|---|---|---|
| none | brown | poor |
| 5 | yellow | excellent |
| 7 | yellow | excellent |
| 10 | yellow | excellent |
| 16 | yellow | excellent |
| 17 | yellow | excellent |

The effectiveness of the following polynuclear hindered phenols (at 0.5%) in inhibiting skinning of a polyamide hot melt adhesive (General Mills Versamid 741) is determined by heating samples at 200° C. for 8 hours.

| Compound of Example | Skinning |
|---|---|
| none | heavy |
| 5 | very light |
| 7 | very light |
| 10 | none |
| 17 | very light |

High impact polystyrene, containing 0.5% of the indicated compounds is dissolved in chloroform, cast on glass plates, dried and molded into 30 mil strips which are then oven aged for 2 months at 70° C. The loss in tensile strength is shown below.

| Compound of Example | Percent Loss of Tensile |
|---|---|
| none | 90 |
| 5 | 30 |
| 7 | 28 |
| 10 | 22 |
| 17 | 29 |

Acrylonitrile-butadiene-styrene terpolymer containing 0.25% of the compound of Example 7 shows less discoloration at 120° C. than a sample containing no additive.

A polyurethane containing 0.5% of the compound of Example 7 shows less yellowing when exposed to UV light than a sample without additive.

What is claimed is:

1. A compound characterized by a six carbon atom aromatic nucleus having attached thereto (1) at the 2, 4 and 6 positions a 3,5-dihydrocarbyl-4-hydroxy benzyl group and (2) through oxygen from one to two organic groups, the remaining groups attached to the nucleus being hydrogen or a hydrocarbyl group, with the proviso that when there is present only one organic group attached to the nucleus through oxygen said organic group must be a 3,5-dihydrocarbyl-4-hydroxyphenyl alkanoic acid radical.

2. A compound according to claim 1 having the following general formula

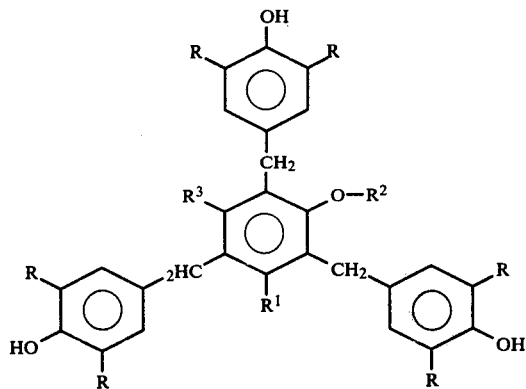

wherein
R is the same or different $C_1$ to $C_8$ hydrocarbyl group;
$R^1$ is hydrogen or a methyl group;
$R^2$ is $C_1$ to $C_{18}$ hydrocarbyl group,

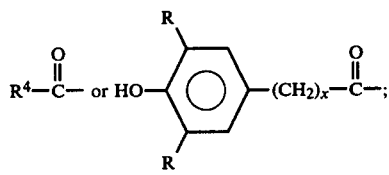

$R^3$ is hydrogen, methyl or $R^2$—O—;
$R^4$ is $C_1$ to $C_{17}$ hydrocarbyl and
x is an integer from 1 to 4
with the proviso that when $R^3$ is hydrogen or methyl $R^2$ must be

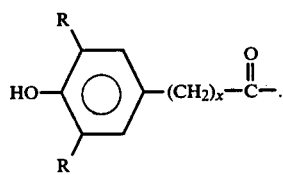

3. A compound according to claim 2 wherein the hydrocarbyl group is an aliphatic hydrocarbon group.

4. A compound according to claim 3 wherein R is a $C_3$ to $C_8$ branched aliphatic hydrocarbon group.

5. A compound according to claim 3 wherein R is the same.

6. The compound according to claim 3 wherein R is different.

7. The compound according to claim 4 wherein R is a tertiary butyl group.

8. A compound according to claim 3 wherein R is methyl.

9. A compound according to claim 3 wherein $R^1$ is hydrogen.

10. A compound according to claim 3 wherein $R^1$ is methyl.

11. The compound according to claims 3, 5, 6 or 7 wherein $R^2$ is a $C_1$ to $C_{12}$ aliphatic hydrocarbon group.

12. The compound according to claims 3, 5, 6 or 7 wherein $R^2$ is

and $R^4$ is a $C_1$ to $C_{12}$ aliphatic hydrocarbon group.

13. The compound according to claims 3, 5, 6 or 7 wherein $R^2$ is

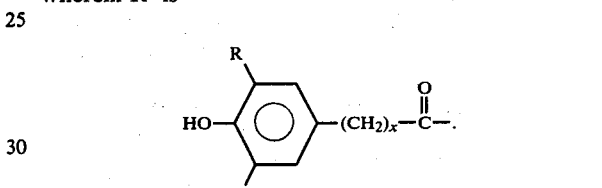

14. The compound according to claim 13 wherein x is 1.

15. A compound according to claim 13 wherein x is 2.

16. A compound according to claims 3, 5, 6 or 7 wherein $R^3$ is hydrogen.

17. A compound according to claims 3, 5, 6 or 7 wherein $R^3$ is a methyl group.

18. The compound according to claims 3 or 7 wherein $R^3$ is $R^2$—O— wherein $R^2$ is a $C_1$ to $C_{12}$ aliphatic hydrocarbon group.

19. The compound according to claims 3 or 7 wherein $R^3$ is $R^2$—O— wherein $R^2$ is

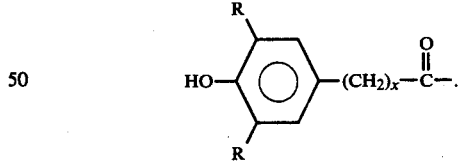

20. The compound according to claim 19 where x=1.

21. The compound according to claim 19 where x is 2.

22. A composition stabilized against oxidative deterioration comprising (a) an organic material susceptible to oxidative deterioration and a stabilizing effective amount of (b) a compound characterized by a six carbon atom aromatic nucleus having attached thereto (1) at the 2, 4 and 6 positions a 3,5-dihydrocarbyl-4-hydroxy benzyl group and (2) through oxygen from one to two organic groups, the remaining groups attached to the nucleus being hydrogen or a hydrocarbyl group, with the proviso that when there is present only one organic group attached to the nucleus through oxygen said 23. Compositions according to claim 22 wherein the compound is according to following general formula

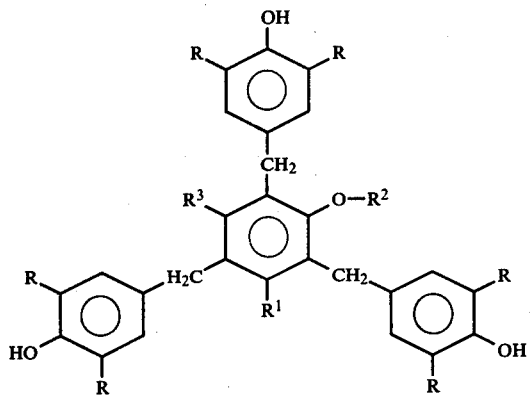

wherein
R is the same or different $C_1$ to $C_8$ hydrocarbyl group;
$R^1$ is hydrogen or a methyl group;
$R^2$ is $C_1$ to $C_{18}$ hydrocarbyl group,

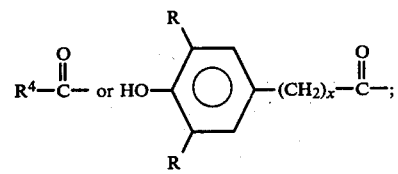

$R^3$ is hydrogen, methyl or $R^2$—O—;
$R^4$ is $C_1$ to $C_{17}$ hydrocarbyl and
x is an integer from 1 to 4
with the proviso that when $R^3$ is hydrogen or methyl $R^2$ must be

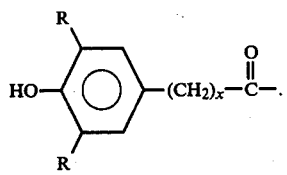

24. The compositions according to claim 23 wherein the hydrocarbyl group is an aliphatic hydrocarbon group.

25. The compositions according to claim 24 wherein the organic material is a polymer.

26. The compositions according to claim 25 wherein the polymer is a polyolefin.

27. The compositions according to claim 26 wherein the polyolefin is selected from polypropylene, copolymers thereof and mixtures containing same.

28. The compositions according to claim 26 wherein the polyolefin is selected from polyethylene, copolymers thereof and mixtures containing same.

29. The compositions according to claim 25 wherein the polymer is selected from polyvinyl chloride, copolymers of vinyl chloride and mixtures containing polyvinyl chloride or copolymers of vinyl chloride.

30. Compositions according to claim 24 wherein the organic material susceptible to oxidative deterioration is selected from hydrocarbon grease, oil and wax.

31. Compositions according to claims 24, 25, 27 or 28 wherein R is a branched $C_3$ to $C_8$ aliphatic hydrocarbon group.

32. Compositions according to claim 25 wherein R is the same.

33. Compositions according to claim 25 wherein R is different.

34. Compositions according to claim 31 wherein R is tertiary butyl.

35. The compositions according to claim 25 wherein $R^1$ is hydrogen.

36. The compositions according to claim 25 wherein $R^1$ is methyl.

37. The compositions according to claim 25, 26, 27, 28, 32, 33 or 34 wherein $R^2$ is

and $R^4$ is a $C_1$ to $C_{12}$ aliphatic hydrocarbon group.

38. The compositions according to claim 25, 26, 27, 28, 32, 33 or 34 wherein $R^2$ is

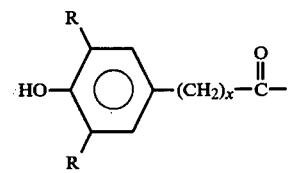

39. Compositions according to claim 38 wherein x is 1.

40. Compositions according to claim 38 wherein x is 2.

41. Compositions according to claim 27 or 28 wherein $R^3$ is hydrogen.

42. Compositions in accordance with claim 33 or 35 wherein $R^3$ is $R^2$—O— and $R^2$ is

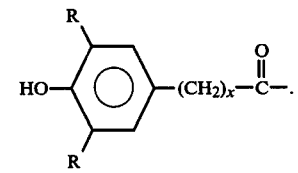

43. The compositions in accordance with claim 42 wherein x is an integer from 1 to 2.

44. The compositions in accordance with claim 37 wherein $R^3$ is $R^2$—O— wherein $R^2$ is

and $R^4$ is a $C_1$ to $C_{12}$ aliphatic hydrocarbon group.

45. A process for making a compound according to the following formula

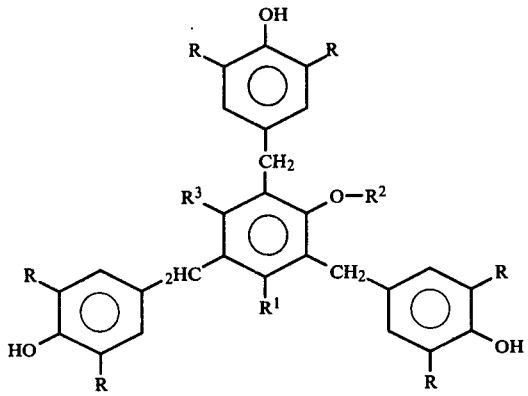

wherein

R is the same or different $C_1$ to $C_8$ alkyl group;

$R^1$ is hydrogen or a methyl group;

$R^2$ is $C_1$ to $C_{18}$ alkyl group,

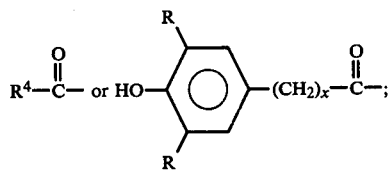

$R^3$ is hydrogen, methyl or $R^2$—O—;

$R^4$ is $C_1$ to $C_{17}$ alkyl and x is an integer from 1 to 4, with the proviso that when $R^3$ is hydrogen or methyl $R^2$ must be

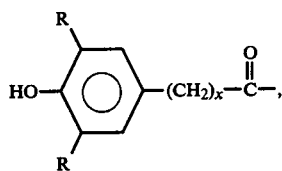

comprising the steps of (a) reacting 3,5-dialkyl-4-hydroxy benzyl alcohol, wherein the alkyl groups are the same or different alkyl groups having one to eight carbon atoms, or 3,5-dialkyl-4-hydroxy benzyl alkyl ether, wherein the alkyl group of the ether has one to six carbon atoms and the 3,5-dialkyl groups are the same or different alkyl groups having from one to eight carbon atoms, with an aromatic hydroxy compound selected from the group consisting of phenol, m-dihydroxy benzene, 3-methyl phenol and 3,5-dimethyl phenol in the presence of an organic acid selected from the group consisting of formic acid and acetic acid to form the intermediate having the following formula

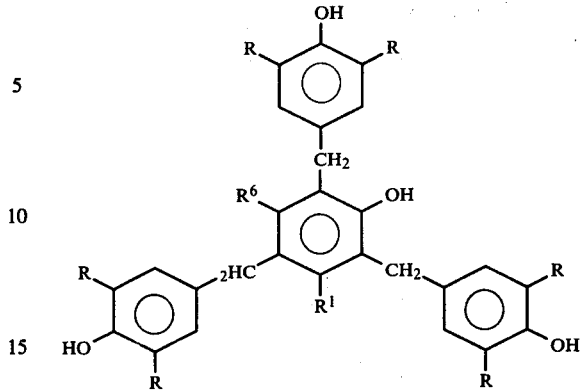

wherein R and $R^1$ are as defined herein above and $R^6$ is hydrogen, hydroxyl or methyl, and (b) reacting the intermediate formed in step (a) with a compound selected from the group consisting of $C_1$ to $C_{12}$ alkyl halides, $C_1$ to $C_{12}$ alkyl salts of oxy acids of sulfur, $C_2$ to $C_{13}$ alkyl monocarboxylic acids, $C_4$ to $C_{26}$ acyclic alkyl anhydrides, $C_2$ to $C_{13}$ monoalkanoyl halides, 3,5-di($C_1$ to $C_8$ alkyl)-4-hydroxphenyl $C_2$ to $C_5$ alkanoic acids and 3,5-di($C_1$ to $C_8$ alkyl)-4-hydroxphenyl $C_2$ to $C_5$ alkanoyl halides.

46. The process according to claim 45 wherein the amount of formic acid or acetic acid in step (a) is between 50 grams and 750 grams per mole of the 3,5 dialkyl-4-hydroxy benzyl alcohol or 3,5-dialkyl-4-hydroxy benzyl alkyl ether.

47. The process according to claim 45 wherein the 3,5-dialkyl-4-hydroxybenzyl alcohol or 3,5-dialkyl-4-hydroxybenzyl alkyl ether is 3,5-ditertiary butyl-4-hydroxybenzyl alcohol or 3,5-ditertiary butyl-4-hydroxy benzyl alkyl ether, respectively.

48. The process according to claim 45 wherein the 3,5-dialkyl-4-hydroxy benzyl alcohol or 3,5-dialkyl-4-hydroxy benzyl alkyl ether is 3-methyl-5-tertiary butyl-4-hydroxybenzyl alcohol or 3-methyl-5-tertiary butyl-4-hydroxy benzyl alkyl ether, respectively.

49. The process according to claim 45 wherein the aromatic hydroxy compound is phenol, m-dihydroxy benzene or 3-methyl phenol.

50. In the process according to claim 45 wherein in step (b) there is used an alkyl monocarboxylic acid, alkyl anhydride, monoalkanoyl halide, 3,5-dialkyl-4-hydroxyphenyl alkanoic acid or 3,5-dialkyl-4-hydroxyphenyl alkanoyl halide.

51. In the process according to claim 45 wherein $R^3$ of the compound is $R^2$—O—.

52. The process according to claim 45 wherein there is used phenol.

53. The process according to claim 45 wherein there is used 3-methyl phenol.

54. The process according to claim 45 wherein there is used 3,5-dimethyl phenol.

55. The process according to claim 45 wherein there is used m-dihydroxy benzene.

56. The process of claims 45, 46, 47, 48, 49, 50, 51, 52, 53, 54 or 55 wherein formic acid is used in step (a).

57. The process of Claim 45 wherein acetic acid is used in step (a).

58. A process for making a compound according to the following formula

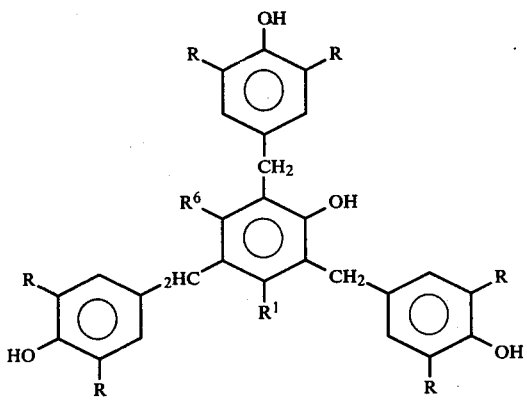

wherein
R is the same or different $C_1$ to $C_8$ alkyl group;
$R^1$ is hydrogen or a methyl group and
$R^6$ is hydrogen, hydroxyl or methyl. comprising the step of reacting 3,5-dialkyl-4-hydroxybenzyl alcohol, wherein the alkyl groups are the same or different alkyl groups having one to eight carbon atoms, or 3,5-dialkyl-4-hydroxybenzyl alkyl ether, wherein the alkyl group of the ether has one to six carbon atoms and the 3,5-dialkyl groups are the same or different alkyl groups having from one to eight carbon atoms, with an aromatic hydroxy compound selected from the group consisting of phenol, m-dihydroxy benzene, 3-methyl phenol and 3,5-dimethyl phenol in the presence of an organic acid selected from the group consisting of formic acid and acetic acid.

59. The process of claim 58 wherein the amount of the organic acid used is from 50 grams to 750 grams per mole of the 3,5-dialkyl-4-hydroxybenzyl alcohol or 3,5-dialkyl-4-hydroxybenzyl alkyl ether.

60. The process of claim 58 wherein R is tertiary butyl.

61. The process of claim 58 wherein each 3,5-dialkyl-4-hydroxybenzyl moiety of the compound has a methyl group as one alkyl group and a tertiary butyl group as the other alkyl group.

62. The process according to claim 58 wherein the aromatic hydroxy compound is phenol.

63. The process of claim 58 wherein the aromatic hydroxy compound is m-dihydroxy benzene.

64. The process of claim 58 wherein the aromatic hydroxy compound is 3-methyl phenol.

65. The process of claim 58 wherein the aromatic hydroxy compound is 3,5-dimethyl phenol.

66. The process according to claim 58 wherein there is used the 3,5-dialkyl-4-hydroxybenzyl alcohol.

67. The process according to claim 58 wherein there is used the 3,5-dialkyl-4-hydroxybenzyl ether.

68. The process of claims 58, 59, 60, 61, 62, 63, 64, 65, 66 or 67 wherein the organic acid is formic acid.

69. The process of claim 58 wherein the organic acid is acetic acid.

* * * * *